United States Patent Office 3,409,398
Patented Nov. 5, 1968

3,409,398
PROCESS FOR THE RECOVERY OF MAGNESIUM VALUES FROM DOLOMITE
Lloyd M. Housh, Santa Clara, Calif., assignor to Kaiser Aluminum & Chemical Corporation, Oakland, Calif., a corporation of Delaware
No Drawing. Filed Dec. 17, 1965, Ser. No. 514,719
9 Claims. (Cl. 23—201)

ABSTRACT OF THE DISCLOSURE

A method of separating the magnesium values from the calcium values in dolomite comprises calcining the dolomite, slaking the dolomite with sufficient water to form magnesium hydroxide and calcium hydroxide, forming said hydroxides into a slurry, contacting said slurry with sufficient cation exchange medium so as to adsorb substantially all the calcium in the slurry, separating said cation exchange medium from the residual slurry of magnesium hydroxide, and separately recovering the magnesium values from the slurry.

---

This invention concerns the separation of magnesium values from calcium values.

Magnesium hydroxide, $Mg(OH)_2$, is a widely used material, both in its own right, for example as milk of magnesia, and as a raw material for the production of magnesia (MgO), one use of which is as a refractory material in constructing high temperature furnaces, for example metallurgical furnaces.

One of the more abundant sources of magnesium oxide is the mineral known as dolomite, a mixed carbonate of magnesium and calcium. However, before the magnesium oxide in dolomite can be used, it is generally necessary to separate out the calcium, for example in the form of the oxide, hydroxide, or carbonate, or as a salt of some anion. Thus, for example, although lime (CaO) is a very refractory material, it shows a strong tendency to react with water vapor and carbon dioxide in the atmosphere. This reaction tends to disintegrate refractory shapes containing free lime. Accordingly, it is frequently desirable to remove the lime from dolomite and to use only the magnesium oxide component as a raw material for making refractories.

According to the present invention, there is provided a method of separating magnesium hydroxide and calcium hydroxide contained in a slurry mixture of these two materials, for example a slurry formed by slaking calcined dolomite with excess water. This separation is carried out by contacting the slurry of magnesium and calcium hydroxides with a cation exchange medium, for example a sodium ion exchange resin, such as a conventional water softening resin. It will be understood that the slurry of magnesium hydroxide and calcium hydroxide solids is contacted with the cation exchange resin for a sufficient time so that the cation originally on the resin, for example the sodium ion in the case of a sodium resin, will have been largely replaced by calcium ions. Afterwards, the calcium-containing exchange medium is separated from the resulting slurry, for example by screening.

As is known, the ion exchange medium can be regenerated, for example by contacting it with a concentrated NaCl solution, to displace the calcium ions with sodium ions and put the medium in its original condition.

It will be understood that in the slurry the magnesium hydroxide and calcium hydroxide are relatively finely divided, for example substantially all passing a 100 mesh screen, and that the ion exchange medium is in the form of relatively coarse particles, for example substantially all retained on a 100 mesh screen.

The magnesium and calcium hydroxide slurry can be formed by calcining dolomite rock to such a temperature and for such a time as to convert substantially all the magnesium and calcium carbonate to magnesium oxide and calcium oxide in an active, as opposed to deadburned, state. The calcined dolomite is then slaked with an excess of water over that required to react with the MgO and CaO to form $Mg(OH)_2$ and $Ca(OH)_2$, preferably so that the resulting slurry contains about 300 grams per liter (g./l.) of solids. The slaking reaction is exothermic and proceeds more rapidly at elevated temperatures. Accordingly, the dilution of the slurry is controlled so that the exothermic heat of the reaction maintains the slurry at a sufficiently elevated temperature for the reaction to proceed at a desirably rapid rate.

Although it is not essential, it is desirable that the slurry be further diluted to a concentration of about 120 g. of solids per liter of slurry and passed through a hydrocyclone or other separating device to remove impurities, for example silicates, most of which will be found to be contained in the material larger than 44 microns, that is to say, in material retained on a 325 mesh screen.

In any case, before treatment with the exchange resin, the slurry is preferably diluted to a concentration of about 5 g./l. The amount of exchange medium used will depend on its type and the concentration of the slurry. For a 5 g./l. slurry about 50 ml. of sodium exchange medium for each liter of slurry being treated has been found satisfactory. However, slurries of higher concentration can be used. In general, it will be found impractical to use a hydroxide solids concentration of over 200 g./l.

The ion exchange medium can be any such material known in the art, for example ion exchange resins. Examples of suitable cation exchange resins are sulfonated phenolformaldehyde resins or sulfonated copolymers of monovinyl aromatic hydrocarbons and polyvinyl aromatic hydrocarbons. A number of such cation exchange resins are known and are available to the trade under the trade names such as "Amberlight IR–120," "Dowex 50," "Nalcite HCR" and "Chempro C–20."

It is an advantage of the method of this invention that by it there is provided a means of separating magnesium hydroxide from calcium hydroxide without complicated chemical reactions or high temperature processes. It is also an advantage of the method of this invention that by it there is produced a magnesium hydroxide which is substantially free of boron, sulfur, and chlorine compounds.

The following examples of the practice of this invention are intended as illustrative and not limiting of the invention.

EXAMPLE I

Dolomite obtained from Natividad, Calif., was calcined at 1,000° C. for 1 hour in a nitrogen atmosphere and then 8.676 g. of the calcine were placed in 2 liters of boiled distilled water. The raw dolomite had the following typical chemical analysis: 21.1% MgO; 31.3% CaO; 0.4% $SiO_2$; 0.1% $Al_2O_3$; 0.1% $Fe_2O_3$; and 47.0% ignition loss (substantially all $CO_2$). A sodium ion exchange resin, Dowex 50W X–8, was added and the mixture agitated for 1 hour with a magnetic stirrer, the entire mixture being in a container protected from the $CO_2$ of the atmosphere by an Ascarite tube. The resin was then screened from the slurry and subsequently the solid contained in the slurry collected on filter paper, washed, and dried at 110° C. Chemical analysis showed the product to have 0.132 part by weight CaO for each part MgO. This is to be compared to a CaO:MgO ratio of 1.48 in the raw material. As a control, two batches of the same calcined dolomite were subjected to the same procedure except that no ion exchange resin was added. Analyses of the resulting material showed the weight ratios of CaO:MgO to be, respectively, 0.568 and 0.599. In other words, the use of the exchange resin reduced the amount of CaO over fourfold compared to a simple washing process and over tenfold compared to the original raw material.

From the analysis of the raw dolomite material and the analysis of the product resulting from the treatment of the calcined dolomite with the ion exchange resin, it can be calculated, on the assumption that none of the MgO was removed from the material, that 91% of the CaO in the dolomite was removed by the exchange process. It should be noted that if, as seems most probable, some of the MgO was removed during the processing, then the percentage of the CaO removed would be even higher.

EXAMPLE II

To 8.676 g. of the calcined dolomite used in Example I were added 2.6 liters of distilled water in a container protected from the $CO_2$ of the atmosphere and the mixture stirred. To this were added 90 ml. of the sodium ion resin of Example I. After reaction, the resin was screened out and a further 45 ml. added, reacted, and screened. The resulting product contained 80.8% of the MgO in the original dolomite and had a weight ratio of CaO:MgO of 0.096. In a control test conducted under the same conditions but with no resin addition, 87.6% of the MgO in the dolomite was recovered but the CaO:MgO ratio was 0.47. In other words, the use of the ion exchange resin reduced the amount of CaO to about one-fifth that obtained without such resin and to less than one-fifteenth that in the raw dolomite.

In the specification and claims, percentages and parts are by weight unless otherwise indicated. Mesh sizes referred to herein are Tyler Standard Screen sizes which are defined in Chemical Engineers' Handbook, John H. Perry, editor-in-chief, third edition, 1950, published by McGraw-Hill Book Company, page 963. Analyses of mineral components are reported in the usual manner, expressed as simple oxides, e.g., $MgO$, $SiO_2$, although the components may actually be present in various combinations, e.g., as a magnesium silicate.

Having now described the invention, what is claimed is:

1. Method of separating the magnesium values from the calcium values contained in dolomite comprising: (1) calcining dolomite to form magnesium oxide and calcium oxide in an active state; (2) slaking said calcined dolomite with an amount of water in excess of that required to form magnesium hydroxide and calcium hydroxide from the MgO and CaO in the calcined dolomite; (3) adjusting the amount of water in said slaked dolomite so as to form a slurry of relatively finely divided magnesium hydroxide and calcium hydroxide with a solids concentration of from about 5 grams per liter to about 200 grams per liter; (4) contacting the slurry formed in step (3) with a cation exchange medium adapted to adsorb calcium ions for such length of time that substantially all the calcium has been adsorbed onto said cation exchange medium, said exchange medium being in particulate, relatively coarse granular form and of an amount sufficient to adsorb substantially all the calcium contained in the slurry of calcined dolomite; (5) subsequently separating said cation exchange medium with adsorbed calcium ions from said slurry; and (6) separately recovering the solid magnesium hydroxide from the slurry.

2. Method according to claim 1 wherein said cation exchange medium is a sodium resin.

3. Method according to claim 1 wherein, in step (4), said slurry is contacted with about 50 milliliters of cation exchange medium for each 5 grams of solid therein.

4. Method according to claim 1 wherein the concentration of the slurry formed in step (3) is about 5 grams of solid per liter of slurry.

5. Method according to claim 1 wherein sufficient water is added in step (2) to form a slurry.

6. Method according to claim 5 wherein the slurry formed in step (2) contains about 300 grams of solids per liter of slurry.

7. Method according to claim 5 wherein the slurry formed in step (2) is, prior to the adjustment of the concentration in step (3), hydrocycloned to remove substantially all particles larger than about 44 microns.

8. Method according to claim 7 wherein the concentration of the slurry formed in step (2) is, just prior to hydrocycloning, adjusted to a concentration of about 120 grams of solids per liter of slurry.

9. Method according to claim 5 wherein, in step (3), the concentration of solids in the slurry is adjusted to about 5 grams of solids per liter of slurry.

References Cited

UNITED STATES PATENTS

| 539,889 | 5/1895 | D'Andria | 23—201 |
| 2,392,435 | 1/1946 | Tyler | 23—48 |
| 2,660,558 | 11/1953 | Juda | 210—38 X |
| 3,239,460 | 3/1966 | Popper et al. | 23—201 X |

OTHER REFERENCES

Schallis: "Economic Considerations in the Recovery of Magnesia from Dolomite," Bureau of Mines Information Circular 7247, August 1943, pp. 1–5 and 10–12.

EDWARD J. MEROS, *Primary Examiner.*